Sept. 8, 1936. F. H. BARNEY ET AL 2,053,509
COUPLING DEVICE
Filed Aug. 25, 1934 2 Sheets-Sheet 1
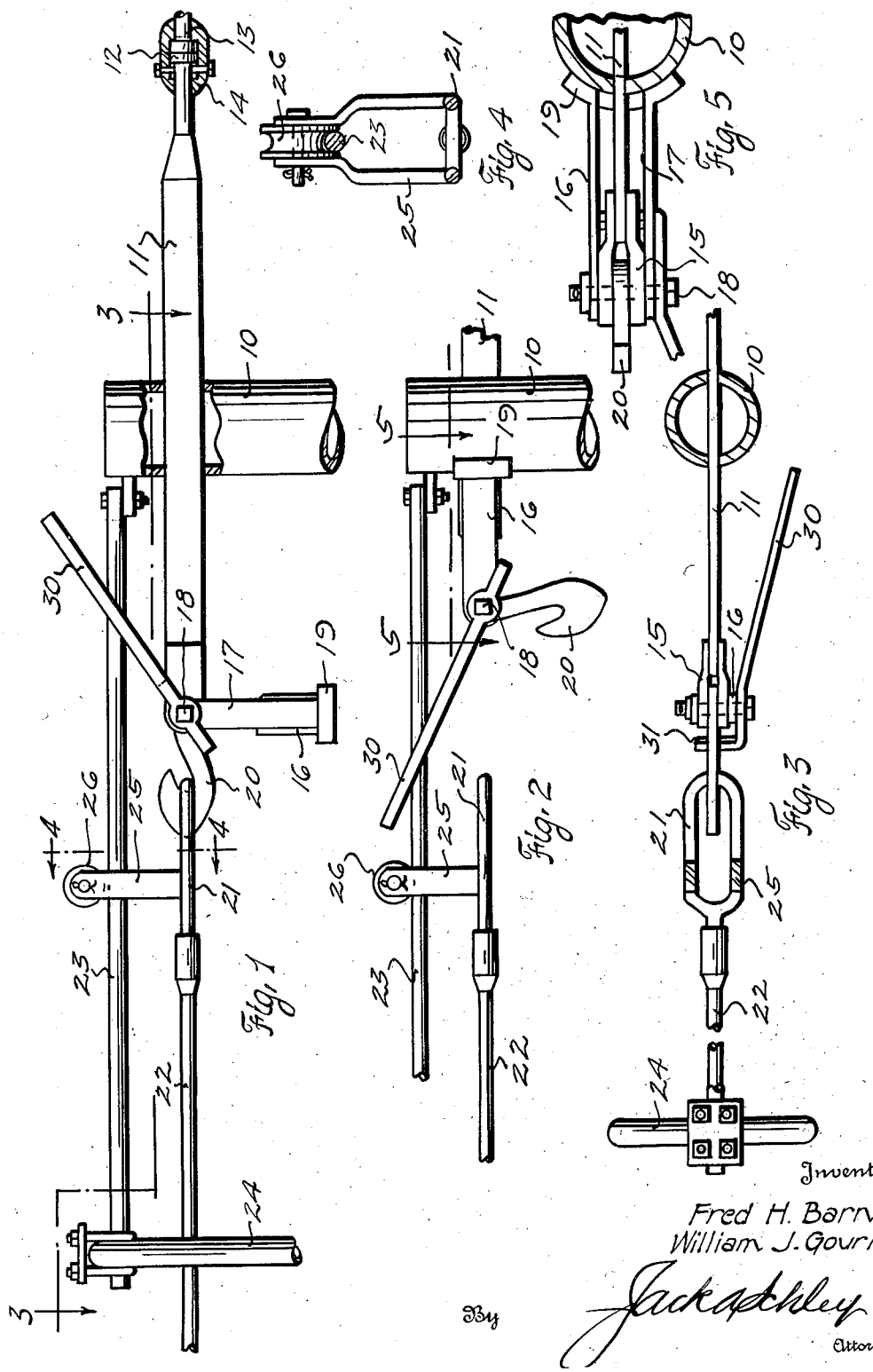
Inventor
Fred H. Barney
William J. Gourley
By Jack Ashley
Attorney Sept. 8, 1936.　　F. H. BARNEY ET AL　　2,053,509
COUPLING DEVICE
Filed Aug. 25, 1934　　2 Sheets-Sheet 2
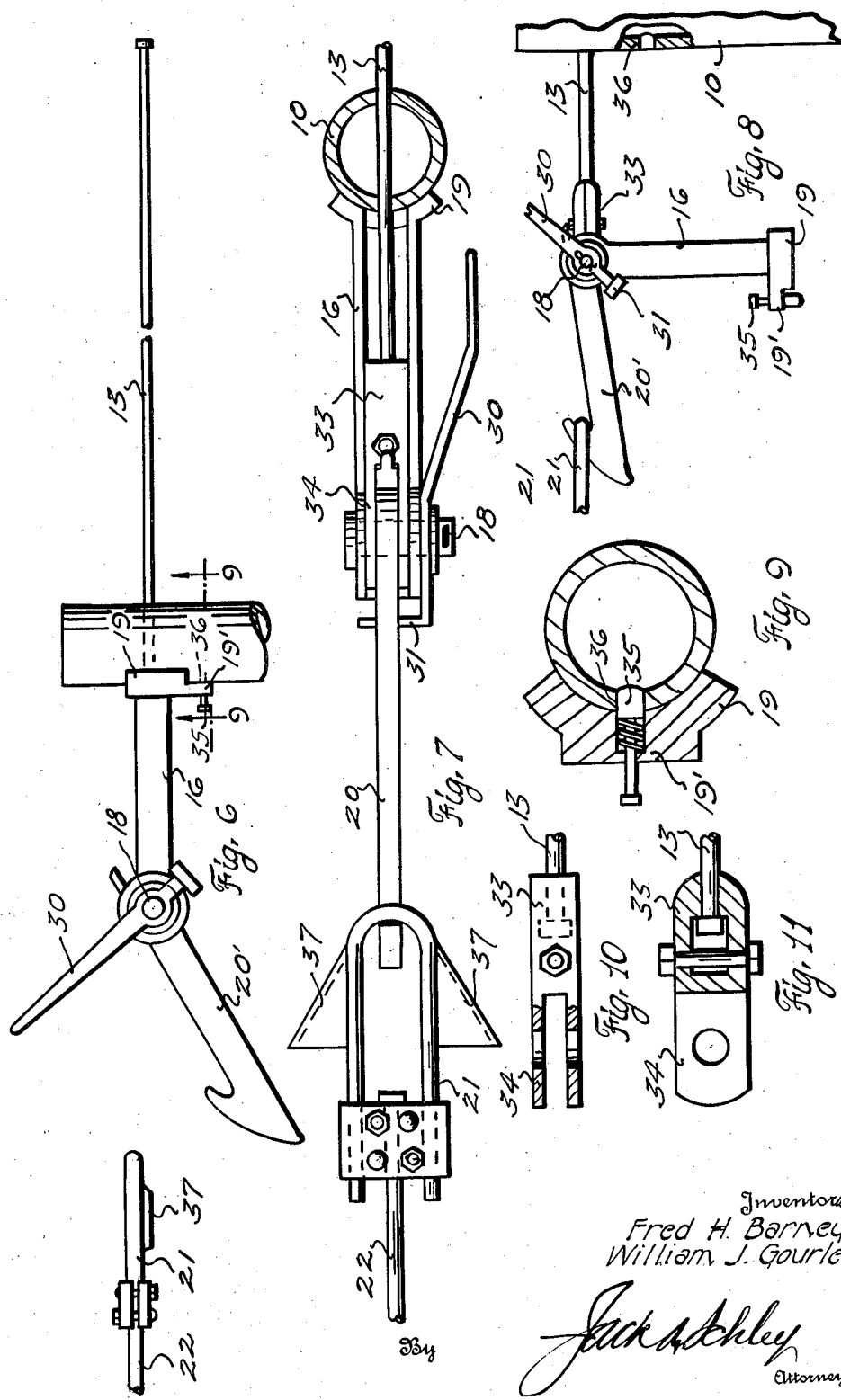
Inventors
Fred H. Barney
William J. Gourley
By Jack A. Ashley
Attorney Patented Sept. 8, 1936

2,053,509

UNITED STATES PATENT OFFICE 2,053,509

COUPLING DEVICE

Fred H. Barney and William J. Gourley,
Fort Worth, Tex.

Application August 25, 1934, Serial No. 741,444

11 Claims. (Cl. 74—593)

This invention relates to new and useful improvements in coupling devices.

In the pumping of oil wells, the rod lines extend from the pumping power to the well, whereby motion from the power is transmitted through the rod lines to pump said wells. In many instances, a well is pumped for some three or four hours a day and is then dormant for a time, after which it is again operated for a short time, and so on. Since several wells are pumped from the same power, it is desirable to disconnect the individual lines of the particular well to be cut off, rather than to stop the power and thereby cease pumping all the wells connected therewith. This disconnection and connection during operation has always been difficult as well as dangerous to the workmen.

One object of the invention is to provide means for expeditiously connecting and disconnecting the rod line from the power, with a minimum danger to the operator.

An important object of the invention is to provide an improved coupling device wherein the hook-up and hook-off members are operated simultaneously and as a unit.

Another object of the invention is to provide an improved hook-off device which is manually operated and which is provided with yieldable operating means, whereby the shock and jar of connection and disconnection of the rod line during reciprocation, is absorbed and is not transmitted to the operator.

A further object of the invention is to provide an improved hook-off device having positive means for holding the knock-off member engaged with the knock-off post when the rod line is disconnected from the power, whereby said knock-off member is prevented from disengaging from said post when the rod line becomes slack for any reason.

Still another object of the invention is to provide improved means for guiding the connecting member of the knock-off device into positive engagement with its complementary member when it is desired to connect the rod line with the power after disconnection has been made.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is an elevation of a knock-off device, constructed in accordance with the invention and showing the device in its connected position, Figure 2 is a similar view showing the hook-off disconnected, Figure 3 is a longitudinal cross-sectional view, taken on line 3—3 of Figure 1, Figure 4 is a transverse, vertical sectional view taken on line 4—4 of Figure 1, Figure 5 is an enlarged plan view of the knock-off member, Figure 6 is an elevation of another form of the device, which shows the hook disconnected, Figure 7 is a plan view of the same, showing the knock-off post in section, Figure 8 is a partial elevation showing the device connected, Figure 9 is a horizontal cross sectional view, taken on line 9—9 of Figure 6, and Figures 10 and 11 are sectional details of the rod clamp forming a part of this type hook-off device.

In the drawings, the numeral 10 designates a knock-off post through which a bar 11 is arranged to reciprocate. The bar is preferably rectangular in cross section and is disposed with one of its edges uppermost, and has a rod head 12 on its outer end, whereby a rod line 13 may be readily connected thereto by means of the usual clamp 14. The inner end of the sliding bar is provided with a clevis 15 which is rigidly secured thereto.

A hook-off prop or support 16 comprising a trough-shaped body 17, is hinged at one end on a pin 18 which passes through the clevis 15. It is pointed out that the prop straddles the clevis. The prop is arranged to swing upwardly to receive the bar 11 and has a curved shoe 19 on its outer end. It is obvious that when the bar 11 is reciprocating and the prop is swung upwardly, the shoe will engage the knock-off post 10 to limit the movement of said bar toward said post and to hold said bar in position when it is disconnected from the pumping power.

A swinging hook 20 is loosely mounted in the clevis 15 on the transverse pin 18. The hook is arranged to engage a stirrup 21 on the end of a pitman 22, which has its other end secured to a pumping power unit (not shown), whereby a reciprocating motion is transmitted to the pitman at all times. When the hook is engaged in the stirrup, and the pitman coupled with the bar, it is obvious that the pull on the rod line by the down stroke of the well rods, will pull the bar 11 and pitman to the right (Fig. 1) toward the post 10, and the power unit will pull said bar and pitman in the opposite direction. It is obvious that during this reciprocation, the knock-off prop 16 must be in its lowered or released position.

For swinging the knock-off prop upwardly so as to engage the post 10, a handle lever 30 is pivotally mounted on the outer end of the pin 18. This handle lever is provided with an inwardly extending finger 31 arranged to engage the hook 20 and swing it into the stirrup 21, when the lever is swung to the right from the position shown in Fig. 2 to the position shown in Fig. 1. When the lever is swung to the left from the position shown in Fig. 1 to the position shown in Fig. 2, the finger will engage the prop 16, and swing it into position to engage the post.

The handle lever is preferably constructed of a resilient metal, such as spring steel, and is bent outwardly toward its upper end, whereby the hand of the operator may be at a distance from the reciprocating members when he swings the handle.

With the hook 20 in engagement with the stirrup 21, as shown in Fig. 1, the hook-off prop has, by its own weight, swung to its lower position. When it is desired to hook-off or disconnect the bar 11 from the pitman 22, it is merely necessary to swing the handle lever to the left (Fig. 2). This causes the finger 31 to be swung so as to engage the prop and swing it upwardly, whereby said prop receives the bar, as shown in Fig. 5. As the pitman and bar move to the right (Fig. 1) the shoe 19 will strike the knock-off post and prevent further movement of the bar 11. The pitman 22, however, being connected to the power unit continues to move and the weight of the hook causes it to swing to its lower position (Fig. 2), thereby disengaging said hook from the stirrup, and uncoupling the bar 11 from the pitman 22. The finger remaining in contact with the prop, will support the lever 30 out of the path of the stirrup and in position to be readily grasped when needed.

For guiding and supporting the pitman in its travel, when it is either in a coupled or uncoupled position, a guide or trolley rod 23 is suspended above said pitman and bar 11 between the knock-off post 10 and an arched support 24. The stirrup 21 of the pitman has an upwardly extending yoke 25 through which the rod extends. A roller 26 journaled in the upper end of the yoke rides on the rod, whereby the stirrup and the pitman are suspended. The yoke and roller constitute a carriage or trolley. When the parts are coupled, as shown in Fig. 1, the roller is suspended above the trolley rod 23 and the pitman 22 is supported in its raised position by its engagement with the hook 20.

When the handle lever 30 is swung, as has been described, to disengage the hook from the stirrup, whereby the pitman is uncoupled from the bar, said pitman drops until the roller 26 rests upon the trolley rod 23. The pitman, being connected with the pumping unit, is of course reciprocating all the time, whether coupled to the sliding bar 11, or not. When the uncoupling is accomplished, it is obvious that the roller 26 supports the pitman and prevents it from dragging on the ground.

When it is desired to again couple the parts, the operator swings the handle lever 30 to the position shown in Fig. 1. The finger 31 engages under the hook and swings said hook upwardly into engagement with the stirrup 21. The weight of the prop causes it to swing to its lower position, as soon as the pitman pulls the bar to the left in Fig. 1. The inclination of the handle lever is such that the operator can easily swing the same without standing too close to the reciprocating parts, thereby eliminating the danger of the workman's hand being caught in any of the moving parts. Heretofore the hook and prop have been swung independently by a small handle extending outwardly from one side of each thereof. However, the handle 30 permits both parts to be operated together and as a unit, thereby not only providing for more positive and efficient operation, but greatly increasing the safety.

In Figs. 6 to 11, we have shown another form of the invention, wherein the sliding bar 11 is eliminated and the rod line 13 is secured in a clamp 33 which is made integral with a clevis 34. The hook 20' is of a slightly different structure and is mounted within the clevis 34 on the pin 18. The handle lever 30 and prop 16 are the same except that the shoe 19 of the prop has an extension 19' depending downwardly therefrom, and a spring-pressed plunger 35 is mounted therein. When the prop is in its upper position, this plunger engages an opening 36 in the knock-off post 10, whereby the prop cannot be swung downwardly until the plunger is released. Thus, when the pitman 22 is uncoupled from the hook, and the prop is in its raised position, the prop is prevented from swinging downwardly, if for any reason a slack is created in the line between the post 10 and the well. If such slack did occur, and the prop swung downwardly, the rod line would be pulled through the post and permit the well tools connected to the line to fall to the bottom of the well, causing serious damage. The plunger 35 is a safety feature which eliminates this danger.

In re-engaging the hook with the pitman after it has been disconnected, it has been found that sometimes it is rather difficult to exactly strike the stirrup 21 with the hook as said stirrup moves into position thereabove. It is to be remembered that the stirrup is at all times reciprocating while the hook is stationary when the device is hooked off. For various reasons, the hook may be moved out of alinement with the stirrup 21 so that upon upward swinging of the hook, no coupling is made.

For guiding the hook into the stirrup, a pair of guide wings 37 are provided. These wings extend outwardly from the sides of the stirrup 21 and by observing Fig. 7, it is obvious that if the hook has for any reason moved out of alinement with the stirrup, said wings will guide the hook into engagement therewith.

The device has been devised for safety to the workmen. The operation of the hook and prop as a unit provide for easier and more efficient operation, and the plunger 35 provides positive holding of the prop until it is desired to hook on again.

The description which has been given recites more or less detail of a particular embodiment of the invention, which is set forth as new and useful; however, we desire it understood that the invention is not limited to such exact details of construction, because it is manifest that changes and modifications may be made, within the scope of the appended claims, without departing from the spirit of the invention.

What we claim and desire to secure by Letters Patent is:

1. A coupling device including, a support, a member slidable through said support, a hook pivoted on said member, a swinging prop carried by the member and adapted to engage the support when swung upwardly, and a swinging means on said member engaging the hook when swung in one direction and engaging the prop when swung in an opposite direction.

2. A coupling device including, a reciprocating pitman, a support, a member slidable through the support, a swinging hook on the support adapted to couple the member with the pitman to transmit motion to said member, a swinging prop mounted on the member and adapted to engage the support to arrest the member whereby the hook may be swung to uncouple the member and pitman, and a swinging means engaging the hook to couple the hook with the pitman when swung in one direction and engaging the prop to engage it with the support when swung in the opposite direction.

3. A coupling device including, a guide rod, a reciprocating pitman beneath said rod, a yoke carried by said pitman and engaging the rod for guiding the travel of said pitman, a roller journaled in the upper end of the yoke and adapted to ride on the rod, a sliding member, coupling means carried by said member for coupling it to the pitman whereby motion is transmitted thereto, means for arresting the member so that the coupling means may be disengaged, and means common to both the coupling means and the arresting means for operating the same.

4. A coupling device including, a support, a member slidable through said support, a hook pivoted on said member, a swinging prop carried by the member and adapted to engage the support when swung upwardly, a swinging means engaging the hook when swung in one direction and engaging the prop when swung in an opposite direction, and means for positively holding the prop in engagement with the support when said prop is swung upwardly.

5. A coupling device including, a support, a member slidable through said support, a hook pivoted on said member, a swinging prop carried by the member and adapted to engage the support when swung upwardly, and a yieldable pivoted lever engaging the hook when swung in one direction and engaging the prop when swung in the opposite direction.

6. A coupling means for coupling a reciprocating member with a member to be reciprocated including, a hook pivoted on said member to be reciprocated, a hook-off prop hinged to said member, and a yieldable pivoted lever mounted so as to engage the hook when swung in one direction and arranged to engage the prop when swung in an opposite direction.

7. A coupling device including, a reciprocating pitman, a support, a member slidable through the support, a swinging hook on the member adapted to couple the member with the pitman to transmit motion to said member, a swinging prop mounted on the member adapted to engage the support to arrest the member whereby the hook may be swung to uncouple the member and pitman, and a yieldable lever pivoted on the member engaging the hook to couple the hook with the pitman when swung in one direction and engaging the prop to engage it with the support when swung in the opposite direction.

8. A coupling device including, a reciprocating pitman, a support, a rod line slidable through the support, a clevis on the end of the rod line, a hook pivoted in the clevis adapted to engage the pitman to couple said pitman with the rod line, a swinging prop straddling the clevis and hinged thereto adapted to engage the support when swung upwardly, and a means pivoted on the clevis adapted to engage the hook when swung in one direction and to engage the prop when swung in an opposite direction.

9. A coupling device including, a support, a member slidable through said support, a hook pivoted on said member, a swinging prop carried by the member adapted to engage the support when swung upwardly, and a pivoted lever having a finger for engaging the hook when the lever is swung in one direction and engaging the prop when swung in the opposite direction, said lever being yieldable to absorb any shock transmitted thereto during operation and also being inclined outwardly from the hook and prop toward its upper end, whereby the operator's hand is some distance from the swinging hook and prop.

10. A coupling device including, pivoted means, a swinging hook thereon, a swing prop on said pivoted means, and means on said pivoted means engaging the hook when swung in one direction and engaging the prop when swung in the opposite direction.

11. A coupling means for coupling a reciprocating member with a member to be reciprocated including, a hook pivoted on the member to be reciprocated, a hook off prop hinged on said last named member, and swinging means also on said last named member engaging the hook when swung in one direction and engaging the prop when swung in the opposite direction.

FRED H. BARNEY.
WILLIAM J. GOURLEY.